United States Patent [19]

Schier et al.

[11] 4,087,037

[45] May 2, 1978

[54] METHOD OF AND TOOLS FOR PRODUCING SUPERPLASTICALLY FORMED AND DIFFUSION BONDED STRUCTURES

[75] Inventors: Joseph F. Schier, Des Peres; Robert E. Rosner, Ferguson, both of Mo.

[73] Assignee: McDonnell Douglas Corporation, St. Louis, Mo.

[21] Appl. No.: 704,067

[22] Filed: Jul. 9, 1976

[51] Int. Cl.$^2$ .............................................. B23K 19/00
[52] U.S. Cl. .................................. 228/106; 228/44.1 R; 228/157; 228/173 A; 228/193; 72/63; 219/85 E; 228/15.1
[58] Field of Search ................. 228/141, 157, 173 A, 228/193, 106, 44.1 R; 72/63; 219/85 E

[56] References Cited

U.S. PATENT DOCUMENTS

| | | | |
|---|---|---|---|
| 2,984,732 | 5/1961 | Herbert, Jr. | 219/85 E |
| 3,701,190 | 10/1972 | Stone, Jr. | 72/63 X |
| 3,920,175 | 11/1975 | Hamilton et al. | 228/173 A |
| 3,927,817 | 12/1975 | Hamilton et al. | 228/157 |
| 3,996,019 | 12/1976 | Cogan | 228/193 X |

Primary Examiner—Donald G. Kelly
Assistant Examiner—K. J. Ramsey
Attorney, Agent, or Firm—Gravely, Lieder & Woodruff

[57] ABSTRACT

The invention covers a method of and tools for producing structures from suitable materials which are sequentially formed superplastically and then diffusion bonded using forming dies that are flexible to conform to desired contours imparted to the mating dies, which can accommodate compound curvatures, and which utilize fluid pressures internal to the tool to force the dies to conform as well as to achieve forming and bonding. The tools consist of a forming die providing contoured cavities or recesses for shaping a superplastically formable component, a flexible die having a shape of the finished structure and cooperating with the forming die, a fluid container for pressure fluid to operate the flexible die, and a retaining structure that cooperates with the forming die to contain and direct the forming pressure in the desired manner.

18 Claims, 8 Drawing Figures

METHOD OF AND TOOLS FOR PRODUCING SUPERPLASTICALLY FORMED AND DIFFUSION BONDED STRUCTURES

BACKGROUND OF THE INVENTION

Superplasticity of certain metals at critical elevated temperatures, such as titanium and certain of its alloys, has been known for many years. The advantages of the superplastic characteristic is that the capability of extreme elongation of such material can be applied to the production of complex shapes. It is also known that at proper temperature and pressure certain metals can be diffusion bonded in which a homogeneous connection between two parts is obtained at the contacting interface or faying surfaces. Diffusion bonding in the case of titanium must take place in an inert atmosphere for protection of the surfaces to avoid oxidation contamination.

The prior art relating to superplastic forming is exemplified by U.S. Pat. to Fields, Jr. et al Nos. 3,340,101; and Hamilton et al 3,920,175 and 3,927,817. These patents have disclosed methods of superplastic forming and diffusion bonding. Generally the disclosure is limited to either simultaneous forming and bonding, or to the use of maskants to areas not desired to be bonded. The prior art appears suitable for producing flat structures of generally small plan form areas. However, the prior art has not disclosed any method suitable for obtaining in large area structures or structures having compound curvature characteristics, the uniform intimate contact of faying surfaces required for diffusion bonding. What has been made known from the past has not been able to solve the problems of obtaining accurate contour matching of the forming dies, of compensating for thermal and mechanical distortion of the dies or variations in stock material thickness and of affording control over the areas or locations where diffusion bonding is to take place without the use of maskants. Even when maskants must be used the control of the effectiveness or the location of the maskants is uncertain, particularly with compound curved parts.

BRIEF SUMMARY OF THE INVENTION

This invention is concerned principally with providing unique forming tools and the attendant method for producing structures composed of superplastically formed and diffusion bonded sheet material, thereby resulting in a structure of at least two sheets.

The forming tool of this invention permits sequential forming control over the metallic parts of the final product by the application of fluid pressure forces to allow superplastic forming to be completed before the parts are allowed to contact for diffusion bonding. When the forming tool is provided with a flexible die, the difficulties of the prior art practice of using maskants as well as control of the maskant locations is overcome and maskants are not needed at all.

The unique tool consists in a forming die having a desired contour and cavities or recesses into which a superplastically formable sheet is forced by fluid pressure and in the correct range of temperature, a cooperating flexible die matching the contour of the forming die and spaced from the forming die to receive the sheets constituting the components of the final product, and a fluid container in position to cooperate with the flexible die in the sequential operation of superplastically forming followed by diffusion bonding of two or more sheets which have been precontoured, if necessary, in any of the usual ways prior to being positioned between the forming and flexible dies. The sheets may be sealed peripherally to effect a pressure tight envelope. The tool utilizes a pressurized inert gaseous fluid injected to separate the sheets and effect superplastic forming of one or more of the sheets, the separation of the sheets being effected before the tool and sheets are brought up to superplastic forming heat, which for titanium is in the range of 1700° F, more or less. The tool and sheets are maintained under internal pressure and at the desired temperature for the required superplastic forming time, after which the first applied pressure for superplastic forming is released and external pressure is applied to the flexible die to press the desired areas of the sheets into contact for diffusion bonding under sufficient pressure and for the time required to complete the bond.

The advantages of the present tool are that it eliminates the need for maskants and the attendant maskant location and tolerance problems, eliminates need for matched close-tolerance dies, simplifies fabrication of parts to compound mold line curvature, avoids need for either a controllable mechanical or hydraulic press, as pressure is supplied by gaseous fluid medium, allows use of dies having significantly less material to heat up and cool down consequently less energy is required, compensates for thermal and mechanical distortion of the dies as well as distortion of the part being fabricated, and compensates for variations in the thickness of the sheets to be formed and bonded.

A preferred embodiment of a forming tool according to this invention includes a forming die part, the provision of a flexible die responsive in proper sequence to the pressurization of the space between the sheets to be formed and united, and to pressure loading thereof to bring the sheets into contact at areas desired for diffusion bonding, and means to support the flexible die and cooperating forming die part during the heating and cooling cycle and during the pressurization stages of the forming cycle.

A further preferred embodiment of this invention for producing superplastically formed and diffusion bonded components comprises a forming die having cavities therein, a cooperating flexible die which may also have cavities therein, said flexible die spaced from the forming die a distance to receive and enclose the components to be formed and bonded, means to pressurize the components to separate them during the superplastic forming and prevent bonding, and means to force the flexible die to conform to the forming die and effect diffusion bonding of the components.

BRIEF DESCRIPTION OF THE DRAWINGS

The present forming tool is shown in several preferred embodiments in the accompanying drawings, wherein.

DETAILED DESCRIPTION OF THE INVENTION

It is assumed herein that the material formed into the end product from the use of the tools is suitable for superplastic forming, as well as diffusion bonding. Such material can be titanium alloy 6AL–4V. At approximately 1700° F titanium can be superplastically formed with modest forces to large deformations, and it is self-bonding at this temperature level when clean surfaces are brought into contact. Pressure is required to get uniform void-free diffusion bonds with complete grain growth across the interface, and to assure contact over the entire surfaces to be bonded. It is essential to avoid accidental contact of the surfaces that are not to be bonded, as undesired bonding can result from accidental contact and significant damage can result if attempts are made to break these bonds during the forming phase.

Figure 1:
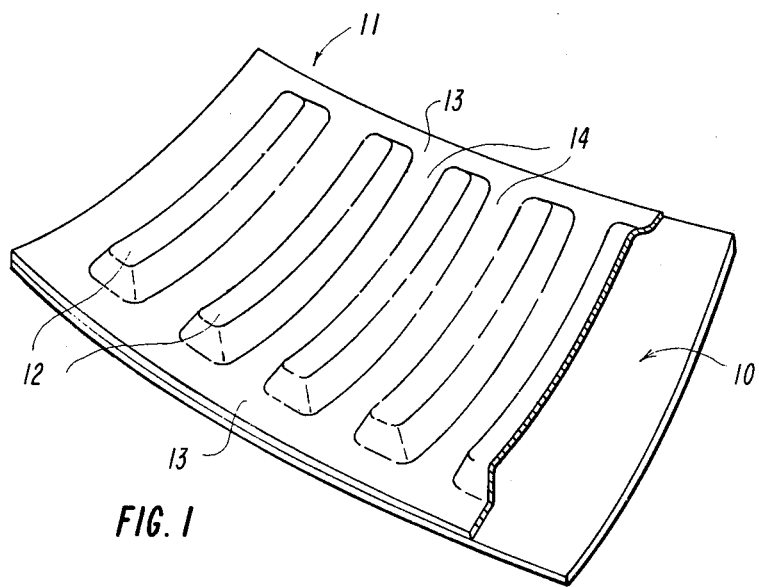
FIG. 1 is a perspective view of a representative structure produced by the use of the present forming tools, the view being presented partly in section.

An example of a part made with the use of the present tools is seen in FIG. 1. The part is made up of a sheet of titanium forming the skin 10, and another titanium sheet 11 in which the desired shapes 12 are superplastically formed in a die. The peripheral portions 13 and strips 14 between these shapes are diffusion bonded by pressure applied in any of the several ways of operation of the present tools.

Figure 2:
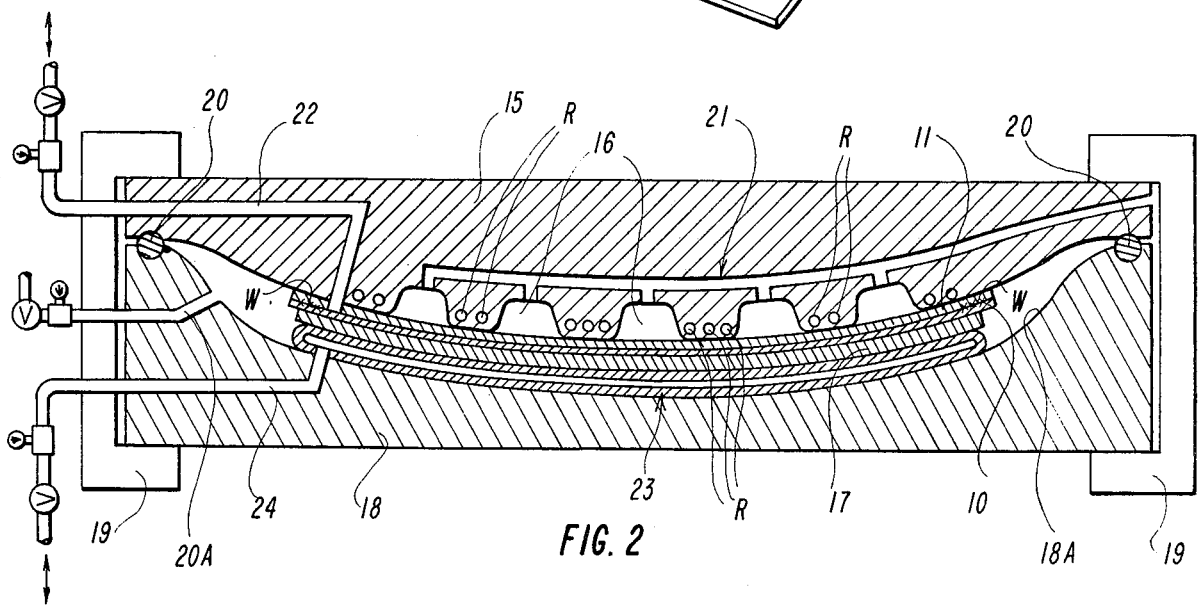
FIG. 2 is a sectional elevational view of a forming tool assembly for forming a structure of the character seen in FIG. 1.

The view of FIG. 2 shows one tool embodiment comprising a forming die 15 having a series of cavities or recesses 16 formed in its working face, a flexible floating die 17 having a working face matching the contour of the forming die, and a die retainer 18. The die 15 and retainer 18 are held in operative assembly by any suitable means, such as by a plurality of peripheral clamps 19 formed with retaining flanges overhanging the die 15 and retainer 18 respectively. An hydraulic or mechanical press could be used in place of the clamps 19. The dies cooperate to provide a cavity therebetween, and the meeting of the dies may include seal 20 to contain argon or other inert gas injected at supply passage 20A and used to flood the cavity between the forming die 15 and retainer 18 to prevent contamination of the outer surfaces of sheets 10 and 11. The die 15 is formed with a system of vent passages 21 communicating between the grooves 16 and the exterior, and with a passage 22 for the flow of a suitable fluid under pressure into the space between the sheets 10 and 11 of titanium which are initially in face-to-face contact. A suitable port or hole is made in the sheet 11 to connect with the passage 22 and admit the gaseous fluid under pressure between the sheets. The sheets 10 and 11 are first joined and sealed in the peripheral margins by welding W, or by bonding or other suitable operation. The fluid to be used in forming titanium is preferably argon or other inert gas compatible with the material to be formed.

The tool also comprises a pressure bag 23 which is suitable formed of stainless steel or other temperature resistant material having a suitably thin wall. The bag 23 is provided with an inlet connection 24 for the supply and exhaust of a pressure fluid, such as argon. When the bag 23 is inflated one wall will be backed up by the fixed retainer 18 and the opposite wall will respond to the pressure fluid and press the flexible die 17 against the sheet 10 to force it against the superplastically formed sheet 11 in the areas between the die recesses 16 where diffusion bonding is desired. The flexible die 17 must have the characteristics of being sufficiently rigid to hold its shape over the recesses 16 without yielding or excessive deflection, and also being flexible enough to accommodate itself to variations in the thickness of the sheets 10 and 11 or variations in the matching face of the forming die 15 so as to conform to the contour of the working face of die 15.

The method of use of the tool is as follows: The tool is first loaded and closed by clamps 19 on the previously edge-sealed titanium sheets 10 and 11, and pressure fluid is injected between the sheets to prevent premature diffusion bonding. This pressure separates sheets 10 and 11, and in so doing displaces the flexible die 17 against the pressure bag 23 which in turn is compressed to a reduced volume. Motion of the flexible die 17 is appropriately limited by the space provided between the forming die 15 and the retainer 18 to assure adequate control of the separation. The tool can now be brought up to heat, such as by the use of well known electrical resistance elements R in the dies, or the tool may be placed in a furnace or other structure where the whole assembly can be brought up to the proper superplastic forming temperature, which for titanium is in the range of 1700° F. The admission of pressure fluid through passage 22 separates and forces the sheet 11 by superplastic flow into the recesses 16, while the sheet 10 will continue to press the flexible die 17 against the bag 23. After the proper time of allowing the pressure on the sheet 11 to effect the superplastic forming thereof, the pressure fluid is exhausted through conduit 22 and pressure fluid is admitted through connection 24 to the bag 23 to press the flexible die 17 upon the sheet 10 and cause the sheet 10 to diffusion bond to the sheet 11 at all faying surfaces. After a proper time of pressure application, the tool is allowed to cool sufficiently, if required, so that the formed and united sheets 10 and 11 can be removed without inducing deformation. The part can then be trimmed and finished.

A unique feature of the tool seen in FIG. 2 is the mounting of the flexible die 17 so it is free to float in the space or cavity 18A in retainer 18 to permit controlled separation of sheets 10 and 11. Die 17 exerts the uniform pressure from the bag 23 over the sheet 10 so as to obtain a full diffusion bond with the surfaces of the sheet 11 supported by the surfaces of the forming die 15. The result is that the need for matched close-tolerance dies is avoided as the flexible die of the tool is forced to conform by fluid pressure, and large area compound curved structure can be produced. In the range of approximately 1700° F, titanium can be formed with modest forces to large deformations, and it is very self-adhering at this temperature when properly cleaned surfaces are allowed to come into contact. Although pressures of the order of about 100 to 1000 psi depending on the time of application, are required to obtain uniform void-free diffusion bonds with complete grain growth across the interface, strong bonds can be achieved in areas of accidental contact at low contact pressures. The tool permits the fluid pressure separation of the sheets 10 and 11 until the superplastic forming is completed, thus preventing accidental contact of the sheets and the resulting accidental diffusion bond.

Figure 3:
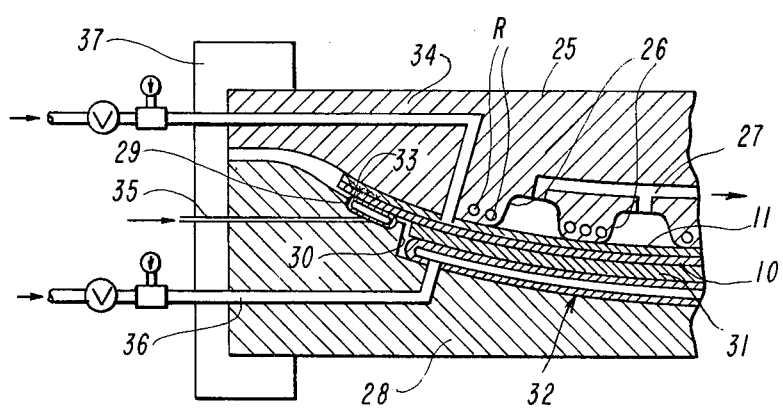
FIG. 3 is a fragmentary sectional elevational view of a modified forming tool for producing a structure of the character seen in FIG. 1.

In the modified of FIG. 3, forming die 25 is provided with cavities 26 which are vented by passage 27. The cooperating retainer 28 is formed with a peripheral channel groove 29 and inwardly thereof with an enlarged cavity 30 for receiving a flexible floating die 31 and a fluid pressure bag 32. The sheets 10 and 11 to be formed and diffusion bonded are stacked and placed between the forming die 25 and the flexible die 31, with the periphery thereof extending generously over and beyond the channel 29 where a pressure seal 33 can apply its clamping force upon the sheets and prevent the sheet 10 from pulling in and wrinkling as the sheet 11 is superplastically formed by pressure fluid injected between the sheets through passage 34. Pressure fluid to seal 33 is supplied by conduit 35, and similar fluid under controlled conditions is supplied by passage 36 to the bag 32. The tool components 25 and 28 are held by a plurality of clamps 37 to oppose the expansion of the peripheral seal 33 and separation due to forming and bonding pressures. The action of the flexible die 31 and bag 32 is similar to the equivalent components seen in FIG. 2. Heat can be supplied by electrical elements in the die 25, as is well understood.

Figure 4:
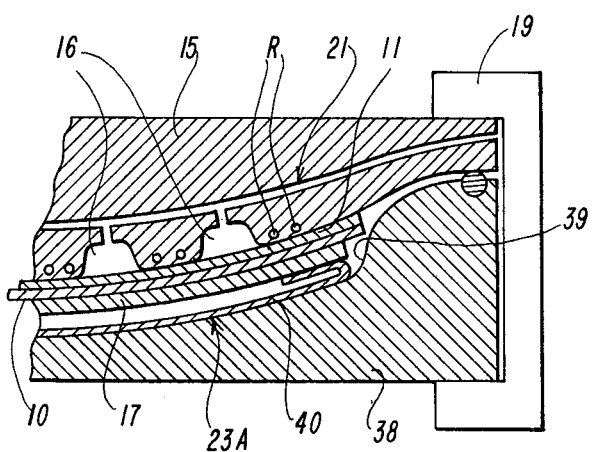
FIG. 4 is a fragmentary sectional view of a tool in which the flexible die forms one wall of a pressure bag for pressing the areas of the sheets into contact for diffusion bonding.

FIG. 4 shows a fragmentary portion of the forming tool in assembly like that of FIG. 2. In describing this view those parts which are similar to the parts pointed out in FIG. 2 will have the same reference numerals. This modified tool includes a retainer 38 formed with a suitable cavity 39 to receive the sheets 10 and 11, as well as the flexible die 17. The die 17 is arranged to form one wall of the bag 23A, the other wall 40 being secured to the back surface of the die 17 so as to retain pressure fluid admitted thereto, as shown in FIG. 2.

Figure 5:
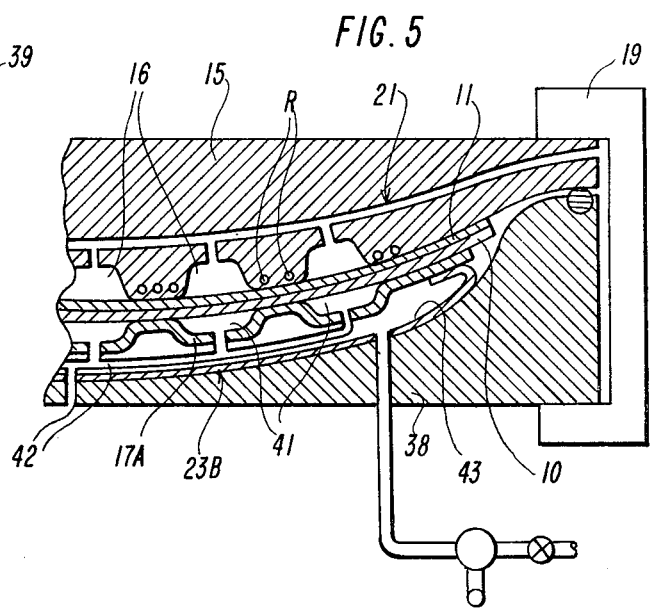
FIG. 5 is a view similar to FIG. 4, but showing a modification of a flexible die having forming cavities and forming cavities in the opposing forming die.

FIG. 5 embodies certain of the structural features shown in FIG. 4, and similar reference numerals will again be used to denote similar parts. In this view the flexible die 17A is now shaped to provide forming cavities 41 so that the sheet 10 can be superplastically formed to the desired shape at the same time sheet 11 is formed into the cavities 16 of forming tool 15. Further, the flexible die 17A is arranged with a suitable vent passage system 42 for the cavities 41. In other respects, the flexible die 17A forms one wall of a pressure bag 23B, the other wall being seen at 43 with its margin tightly secured to the back of the die 17A.

Figure 6:
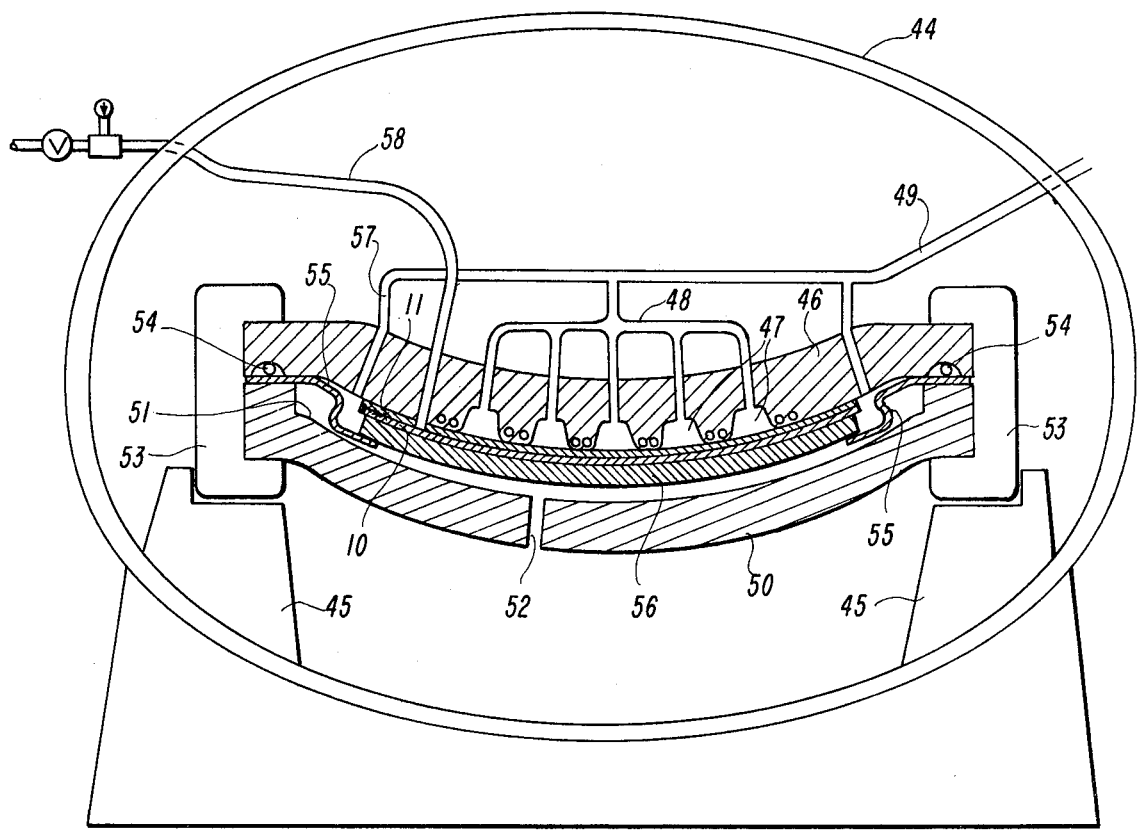
FIG. 6 is a sectional view of a modified tool adapted for insertion in an autoclave or pressurized chamber, and in which the flexible die is capable of floating to permit adequate separation of the titanium sheets.

The view of FIG. 6 shows the tool in a modified form in position in an autoclave 44 after being inserted through the open end and supported on stands 45. The tool includes a forming die 46 having the cavities 47 in its working face. The cavities 47 are vented by passage 48 to a main vent passage 49 which is passed through the wall of the autoclave to ambient atmosphere. A cooperating die retainer 50 is formed with a cavity 51 which communicates at passage 52 with the interior of the autoclave. The retainer 50 and forming die 46 are held in position by a plurality of clamps 53 around the periphery so that suitable seals 54 can be effective to seal the space of the cavity 51 containing the sheets 10 and 11. Such space is separated from the cavity 51 by flexible elements 55 so as to be isolated from autoclave pressure. The cavity 51 is loaded with the sheets 10 and 11 to be formed and bonded in the manner before described. These sheets are supported on a flexible die 56 which is connected to the flexible seal elements 55. The space at the upper side of the seals 55 is vented by being connected by passages 57 into the main vent passage 49. As noted above, the sheets 10 and 11 are separated prior to being raised to superplastic forming temperature by the introduction of argon gas through the passage 58. The margins of sheets 10 and 11 are sealed by welding or by other means so that the pressurization of the space between them will be effective to separate the sheets and apply the superplastic forming pressure on sheet 11.

The arrangement of the tool in FIG. 6 has avoided the need for a pressure bag, such as bag 32 in FIG. 3, and can rely upon the pressure developed in the autoclave being admitted behind the flexible die 56 by means of passage 52.

Figure 7:
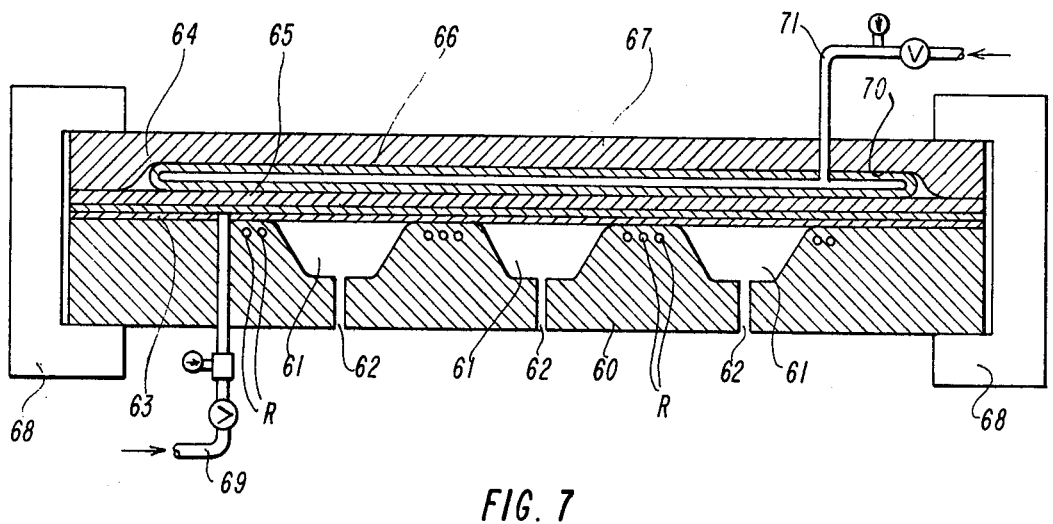
FIG. 7 is a fragmentary sectional elevational view of a modified forming tool suitable for forming structure with a flat or slightly curved shape.

A further modification is seen in FIG. 7 where the tool incorporates simplifications which are possible when producing structures of slight or no curvature. In this arrangement the flexible die 65 is clamped peripherally between the forming die 60 and the retainer 67, and is not required to float. Separation of sheets 63 and 64 by pressure introduced through port 69 is permitted by bending deflection of the flexible die 65. The forming die 60 has desired cavities 61 with vent passages 62 opening therefrom. The sheets 63 and 64 are placed over the cavities 61 and the flexible die 65 is positioned over the sheet 64, after which a pressure bag 66, formed of thin metal, and the retainer 67 are placed in position over the flexible die 65. The assembly of the foregoing components is then firmly clamped about its periphery by clamps 68, and brought up to heat by the electric resistance heating means R after a pressure fluid is admitted through conduit 69 to separate sheet 64 from sheet 63 in the area inwardly of the peripheral connection of those sheets. Separation of sheet 64 and sheet 63 is permitted by bending deflection of the flexible die 65 which compresses the pressure bag 66 into the cavity 70 in the retainer 67. After the superplastic forming has been completed, conduit 69 is vented and pressure fluid is admitted through conduit 71 to the bag 66 to press the flexible die 65 against sheet 64 and effect diffusion bonding of the two sheets in the contacting areas.

Figure 8:
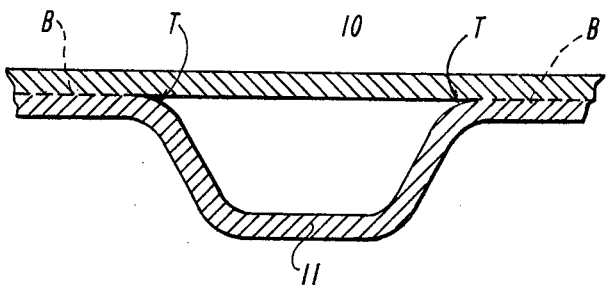
FIG. 8 is a fragmentary sectional view of the finished part to show the diffusion bond and illustrate the location of the bend tangent.

The present tool results in diffusion bonding continuously from bend tangent to bend tangent. As can be seen in FIG. 8, which depicts a section of the finished part sheet 11 is separated from sheet 10 between the bend tangent points T and diffusion bonded over the contacting surfaces at B. This is important and solves a serious problem heretofore present in prior efforts to provide tooling that could produce a desirable product using superplastic forming and diffusion bonding. The present forming tool produces a finished superplastically formed and diffusion bonded product in which the several sheets are accurately joined and the areas bonded together are precisely located so that the maximum strength is obtained. In certain prior art efforts a maskant is relied upon to prevent diffusion bonding in certain areas between sheets to be structurally united. When the maskant is not properly located the sheets are diffusion bonded in undesired areas or are not bonded in areas that require structural unity. These results can degrade the strength and compromise the otherwise achievable structural efficiency. The accuracy of matching the forming dies is important as internal thermal gradients can produce contour mismatch due to die deflections. For example, a die contour mismatch will cause high contact pressures in some areas and inadequate contact in other areas. Where mechanical pressure is required to achieve bonds no significant contour mismatch can be tolerated. Whereas die contour mismatch may be tolerated, and acceptable bonds may be produced using internal die cavity fluid pressure, as is the case of the prior art, such mismatch may produce distortions in finished parts which may vary from minor blemishes to structurally unacceptable defects.

The foregoing description has set forth the unique characteristic of the tooling which eliminates the need to mask off areas of the sheets that are not to be diffusion bonded, thereby eliminating certain problems of the prior art in obtaining proper registration of the sheets in the areas where diffusion bonding occurs. The unique tooling simplifies the requirements for fabricating large parts and it is especially adaptable for fabricating parts having compound curvatures. The product coming out of the unique tooling is especially desirable in connection with the fabrication of certain aircraft structure as it is an important contributor to reducing cost by extending the adaptability of superplastic forming and diffusion bonding, thereby eliminating the usual accepted practice of relying upon many separately formed or machined structural elements held together with mechanical securing means, by welding or by other suitable means.

We claim:

1. A method of making a metallic structure from a plurality of workpieces capable of being superplastically formed and diffusion bonded, the method comprising: providing at least two shaping members having opposed working face areas with substantially the same contour over said working face areas and one of which is rigid and provided with a forming cavity in its working face area opposed to the working face area of the other one, said other shaping member being flexible, but having substantially greater rigidity than the workpieces when the workpieces are at superplastic forming temperatures; placing two workpieces in facing contact with each other between the opposed working face areas of said shaping members; separating the contacting faces of said workpieces by application of pressure fluid therebetween to separate and move one of the workpieces and the other one of said shaping members away from said one rigid shaping member; supporting said other shaping member to limit its separating movement; bringing the workpieces up to superplastic forming and diffusion bonding temperature and sustaining that temperature while one workpiece is superplastically conformed to the working face area and cavity of said rigid shaping member by the pressure fluid; releasing the pressure fluid from between the workpieces; and applying sufficient pressure to the other shaping member to move it toward the rigid shaping member and press the opposed face areas of the workpieces into contact for diffusion bonding of the workpieces except in the areas bridging over the superplastically formed cavity in the one workpiece which follows the working face of and cavity in the rigid shaping member, said pressure being insufficient to deform said other shaping member into the cavity.

2. The method of claim 1 wherein said other shaping member flexes to conform to the shape of the working face area of the rigid shaping member and the thickness of the workpieces upon being pressed toward said one rigid shaping member.

3. The method of claim 1 wherein the other shaping member is flexible and has a forming cavity in the working face area thereof.

4. The method of claim 1 wherein the other shaping member is provided with a forming cavity located to register with the forming cavity in the one rigid shaping member.

5. The method of claim 1 wherein the movement of said other shaping member toward said one rigid shaping member is by pressure fluid to obtain uniform contact of the working face areas of the shaping members with the surfaces of the workpieces therebetween to assure diffusion bonding contact between the workpieces.

6. The method of claim 1 including clamping the margins of the workpieces and allowing the other shaping member freedom to follow the movement of one of the workpieces as it separates from the other one of the workpieces.

7. The method of claim 1 including allowing the other shaping member limited flexing action on separating movement from the rigid shaping member.

8. A tool for making a structural article in which a first sheet is in sequence superplastically formed at one of its surface areas with at least one cavity and diffusion bonded in other surface areas to a second sheet, said tool comprising: a substantially rigid shaping die having a working face area provided with at least one forming cavity presented to a first sheet; a flexible die member having a working face area presented toward the rigid shaping die and a back face presented away from the rigid shaping die, the working face area of the flexible die member cooperating with said working face area of said rigid shaping die and engaging upon a second sheet adjacent the first sheet, the flexible die member having sufficient rigidity to bridge and not sink into the cavity in the rigid shaping die when the sheets are in a superplastic condition and the flexible die member is subjected to a pressure applied substantially uniformly over substantially the entire back face thereof with sufficient magnitude to press the flexible die member toward the rigid shaping die with enough force to effect a good diffusion bond between the sheets; means to retain said flexible die member in predetermined position relative to said shaping die; means to supply a pressure fluid between the sheets to flex said flexible die member away from said rigid shaping die so as to retain the sheets separated, at least in a predetermined internal nonconnected area, and to force the first sheet by the pressure fluid to deform superplastically and conform to the working face and cavity of the rigid shaping die; other means to supply a pressure fluid between said retainer means and said flexible die member to flex said flexible die member in an opposite direction and force the second sheet into bonding position with the superplastically formed first sheet and bridge over the forming cavity without deforming into that cavity; and means to supply heat in the superplastic and diffusion bonding range.

9. The tool set forth in claim 8 wherein said flexible die member is movable relative to said rigid shaping die and free to float between said rigid shaping die and said retaining means, said flexible die member assuming a working position relative to said rigid shaping die and to the first and second sheets.

10. The tool set forth in claim 8 wherein a pressure fluid bag operates said flexible die member to force the second sheet into contact with the superplastically formed first sheet.

11. The tool set forth in claim 8 wherein flexible seal means is attached to and connects said flexible die member to said shaping die to permit movement of said flexible die member relative to said shaping die.

12. The tool set forth in claim 8 wherein said means to retain said flexible die member includes a rigid member having a recess therein, and a pressure fluid bag disposed in said recess, whereby said flexible die member is positioned adjacent to said bag to be responsive to pressure fluid supplied to said bag to press the second sheet onto the first sheet and effect diffusion bonding therebetween.

13. A tool for making a structural article consisting of superplastically formed and diffusion bonded metallic components, said tool comprising: a first rigid die having a component shaping face and at least one cavity therein; a second flexible die having a back face and a working face with the latter being presented to the shaping face of said first rigid die and spaced from the first rigid die by the metallic components to be formed and diffusion bonded, the second flexible die having sufficient rigidity to bridge and not sink into the cavity in the first rigid die when the components are in a superplastic condition and the second flexible die is subjected to a pressure applied against substantially the entire back face thereof with sufficient magnitude to press the flexible die toward the rigid die with enough force to effect a good diffusion bond between the components; means for securing the margins of said components in fixed contact; a retainer member fixed relative to said first rigid die to provide a space therebetween to accommodate said second flexible die; a first means cooperating with said dies to supply a pressure fluid between the components to separate and hold them in spaced relation and move said second flexible die in said retainer space and away from said first rigid die; means for heating said first rigid die to the range of superplastic forming temperature; and second means to apply pressure on the back face of said second flexible die to press it toward said first rigid die such that the flexible die bridges over said cavity without deforming into the cavity and holds the components in contact for diffusion bonding.

14. The forming tool set forth in claim 13 wherein said second flexible die is movable relative to said first rigid die and free to float between said first rigid die and retainer member and assume a cooperative working position relative to said first rigid die and the metallic components.

15. A tool for making superplastically formed and diffusion bonded metallic structural components having a first sheet diffusion bonded to a second superplastically formed sheet, said forming tool comprising: a first forming die having at least one forming cavity in a working face area thereof; a die retainer cooperating with the first forming die to form a closed cavity presented toward the forming cavity of the first forming die; a second forming die in the closed cavity and being movable toward and away from said first forming die, said second forming die having a working face area spaced from said working face area and forming cavity of said first forming die, said working face area with said forming cavity and the working face area of said second forming die being substantially coextensive and the space therebetween being sized to receive the sheets; means for securing the first forming die and the die retainer firmly together; means to heat the forming tool and sheets to the range of temperature at which superplastic forming of the sheets takes place; and separate means to supply pressure fluid to displace said second forming die in a direction to permit separation of the sheets and simultaneously superplastically force a portion of the area of one of the sheets aligned over said cavity into said forming cavity in said first forming die to form the same and to supply a pressure fluid on said second forming die to displace the same in a direction to press the other sheet onto the non cavitied portion of the formed sheet for diffusion bonding the sheets.

16. The forming tool set forth in claim 15 wherein said second one of said forming dies is flexible to yield to the application of said pressure fluid from each of said pressure fluid supplies.

17. A method of making a metallic structure from a plurality of workpieces capable of being superplastically formed and diffusion bonded, the method comprising: providing a forming die having at least one forming cavity; providing a cooperating flexible die having at least one forming cavity; placing the workpieces in position between the forming and flexible dies; retaining the peripheral portions of the workpieces in sealed engagements; and in sequence separating the workpieces by internal pressurization to separate areas thereof in initially contacting relation, bringing the workpieces to superplastic forming temperature and sustaining that temperature for the time required to effect superplastic forming while utilizing the internal pressure to force the workpieces to conform to the forming cavities, releasing the internal pressure, and pressurizing the cooperating flexible die externally to bring the workpieces into contact for the time required to effect diffusion bonding of the workpieces in contacting areas.

18. A method of making a metallic structure from a plurality of workpieces capable of being superplastically formed and diffusion bonded, the method comprising: providing a forming die having at least one forming cavity; providing a cooperating flexible die having at least one forming cavity substantially registered with the forming cavity in said forming die; placing the workpieces in position between the forming and flexible dies; retaining the peripheral portions of the workpieces in sealed engagements; and in sequence separating the workpieces by internal pressurization to separate areas thereof in initially contacting relation, bringing the workpieces to superplastic forming temperature and sustaining that temperature for the time required to effect superplastic forming while utilizing the internal pressure to force the workpieces to conform to the forming cavities, releasing the internal pressure, and pressurizing the cooperating flexible die externally to bring the workpieces into contact for the time required to effect diffusion bonding of the workpieces in contacting areas.

* * * * *